(12) United States Patent
Chebli et al.

(10) Patent No.: US 8,900,387 B2
(45) Date of Patent: Dec. 2, 2014

(54) METHODS AND APPARATUS FOR STITCHING TIRE PATCHES

(75) Inventors: Adib Tony Chebli, Greer, SC (US); Metodi Lubenov Ikonomov, Moore, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 441 days.

(21) Appl. No.: 12/918,809

(22) PCT Filed: Feb. 22, 2008

(86) PCT No.: PCT/US2008/054642
§ 371 (c)(1),
(2), (4) Date: Aug. 20, 2010

(87) PCT Pub. No.: WO2009/105108
PCT Pub. Date: Aug. 27, 2009

(65) Prior Publication Data
US 2011/0000600 A1    Jan. 6, 2011

(51) Int. Cl.
*B29C 73/10*    (2006.01)
*B29C 73/12*    (2006.01)
*B29L 30/00*    (2006.01)

(52) U.S. Cl.
CPC ............... *B29C 73/12* (2013.01); *B29C 73/10* (2013.01); *B29L 2030/00* (2013.01)
USPC ............... 156/97; 156/95; 156/350; 156/358; 156/408

(58) Field of Classification Search
USPC ........ 156/97, 130.3, 351, 358, 408, 409, 410, 156/421, 421.6, 95, 350; 152/370, 371; 425/26; 81/15.2, 15.3
See application file for complete search history.

(56) References Cited

U.S. PATENT DOCUMENTS

| 1,543,151 | A |   | 6/1925  | Cooper |
|-----------|---|---|---------|--------|
| 1,591,817 | A | * | 7/1926  | Hawkinson ............ 156/97 |
| 2,354,434 | A |   | 7/1944  | Stevens |
| 2,802,506 | A |   | 8/1957  | Agle et. al. |
| 3,152,942 | A |   | 10/1964 | Horton et al. |

(Continued)

FOREIGN PATENT DOCUMENTS

| EP | 0585647 A1 | 3/1994 |
|----|------------|--------|
| EP | 1820629 A1 | 8/2007 |

(Continued)

OTHER PUBLICATIONS

Machine-generated English translation of JP 07-117151 (date of original document: May 1995).*

(Continued)

*Primary Examiner* — Martin Rogers
(74) *Attorney, Agent, or Firm* — Hahn Loeser & Parks, LLP

(57) ABSTRACT

Methods, computer program products, and apparatus for stitching the interior surface of a tire, the steps of the method including rotating the tire about a central rotational axis, applying a force to maintain the tire in a substantially radial fixed position relative to a stitching wheel; applying a predetermined force to the interior surface of the tire with the stitching wheel, the stitching wheel contacting the interior surface of the tire while the tire is rotating; and, mechanically translating the stitching wheel laterally across the interior of the tire during tire rotation.

11 Claims, 9 Drawing Sheets

(56) References Cited

U.S. PATENT DOCUMENTS

| | | | | |
|---|---|---|---|---|
| 3,282,319 | A | * 11/1966 | Barnett | 152/367 |
| 4,057,455 | A | 11/1977 | Klose | |
| 4,100,955 | A | * 7/1978 | Pottinger et al. | 152/541 |
| 4,272,301 | A | * 6/1981 | Galbraith et al. | 134/8 |
| 4,398,492 | A | * 8/1983 | Casey | 118/105 |
| 4,669,417 | A | * 6/1987 | Pederson et al. | 118/44 |
| 4,936,138 | A | * 6/1990 | Cushman et al. | 73/146 |
| 5,087,102 | A | * 2/1992 | Kiefer | 299/72 |
| 5,207,849 | A | 5/1993 | Siegenthaler | |
| 5,468,319 | A | 11/1995 | Siegenthaler | |
| 6,244,104 | B1 | * 6/2001 | Koch et al. | 73/146 |
| 6,439,282 | B1 | * 8/2002 | Kimura et al. | 152/158 |
| 2006/0048884 | A1 | * 3/2006 | Kudo et al. | 156/130.3 |
| 2007/0023952 | A1 | * 2/2007 | Bull et al. | 264/174.1 |
| 2007/0079921 | A1 | * 4/2007 | Phippen et al. | 156/130.3 |
| 2007/0169870 | A1 | * 7/2007 | Manno et al. | 152/531 |

FOREIGN PATENT DOCUMENTS

| | | | | |
|---|---|---|---|---|
| JP | 53-101077 | * | 9/1978 | G05D 15/01 |
| JP | 07-117151 | * | 5/1995 | B29D 30/28 |
| JP | 2006-159572 | * | 6/2006 | B29D 30/28 |

OTHER PUBLICATIONS

English language Abstract of JP 53-101077 (date of orifinal document: Sep. 1978).*
Machine-genereated English language translation of JP 2006-159572 (original document dated Jun. 2006).*
Radial Tire Conditions Analysis Guide the Maintenance Council, 2004 Page X.*
PCT/US2008/054642 International Search Report, Form PCT/ISA/210, dated Jun. 5, 2008, 2 pgs.
PCT/US2008/054642 Written Opinion, Form PCT/ISA/237, dated Jun. 5, 2008, 6 pgs.

* cited by examiner

METHODS AND APPARATUS FOR STITCHING TIRE PATCHES

This application is a National Stage application of PCT Application No.PCT/US2008/054642, filed Feb. 22, 2008, to which this application claims priority and the benefit of, the disclosure of which is also hereby incorporated by reference.

BACKGROUND OF THE INVENTION

1. Field of the Invention

This invention relates generally to stitching the inside of a tire, and, more specifically, to stitching repair patches along an inside surface of a tire.

2. Description of the Related Art

When repairing a portion of a tire, a patch may be used to cover and seal the portion to be repaired. A patch may be made from various types of materials, such as, rubber and polymeric materials. Once applied, the patch may be stitched to promote adhesion and to reduce any air trapped between the patch and the tire.

SUMMARY OF THE INVENTION

Particular embodiments of the present invention include methods, computer program products, and apparatus for stitching the interior surface of a tire. Particular embodiments of the present invention include methods for stitching the interior surface of a tire that include the steps of rotating the tire about a central rotational axis, and applying a force to maintain the tire in a substantially radial fixed position relative to a stitching wheel. Other steps may include applying a predetermined force to the interior surface of the tire with the stitching wheel, the stitching wheel contacting the interior surface of the tire while the tire is rotating, and mechanically translating the stitching wheel laterally across the interior of the tire during tire rotation.

Particular embodiments of the present invention include an apparatus for stitching an interior surface of a tire, the apparatus including a rotatable tire mount, a stitching wheel for applying a force to the interior surface of the tire, means for generating the force to be applied to the tire with the wheel, and means for translating the stitching wheel laterally across the interior of a tire.

Particular embodiments of the present invention include a computer program product including instructions embodied on a computer readable storage medium, the computer program product acting to direct the stitching of an inside surface of a tire, the computer program including rotating instructions for rotating the tire circumferentially, applying instructions for applying a force to the interior surface of the tire with the stitching wheel, and translating instructions for translating the stitching wheel laterally across the interior of the tire.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
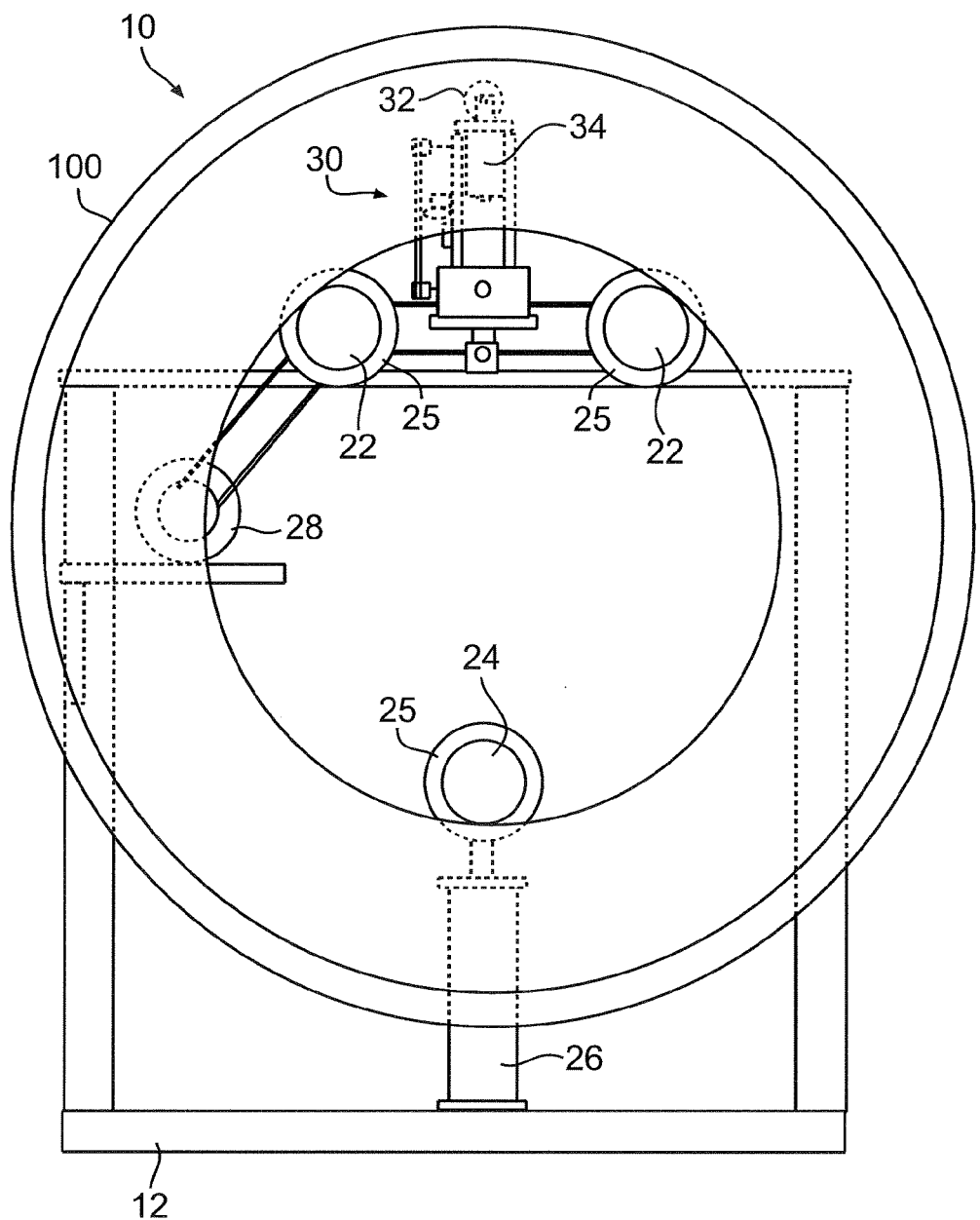
FIG. 1 is a front view of a tire stitching machine according to an embodiment of the invention.

Particular embodiments of the present invention provide methods, computer program products, and apparatus for stitching the interior surface of a tire carcass. It may be desirous to stitch the inside of a tire, such as after applying a repair patch, as stitching may promote proper contact between the patch and the tire. Stitching may also remove air that is trapped between the patch and the tire.

Particular embodiments of the present invention include methods of stitching a repair patch on the interior surface of a tire. The methods, in whole or in part, may be performed by way of a machine. Particular embodiments of such methods may include a step of positioning a tire in rotatable relation to a tire stitching wheel. Particular embodiments may also include a step of applying a force to maintain the tire in a substantially radial fixed position relative to a stitching wheel. The methods may further include the step of rotating the tire about a central axis, the interior tire surface having a circumference. A stitching machine, such as those discussed below in various exemplary embodiments, may be provided to perform the methods disclosed herein. The machine may include a stitching head for stitching the interior of the tire. The stitching head may include a stitching wheel for fluently translating along the tire surface without damaging the tire surface. For the stitching wheel to engage the tire, the tire may be mounted in relation to the stitching head and may be rotatable so that the stitching wheel may translate about the circumference of the interior of the tire. The machine may also include a bottom roller that applies a force to the tire, such as by way of a cylinder, for maintaining the tire in a substantially radial fixed position relative to a stitching head and/or wheel. Accordingly, the methods may further include the step of applying a measured, or predetermined, force to the interior surface of the tire with the stitching wheel, the stitching wheel contacting the interior surface of the tire while the tire is rotating. In particular embodiments, the step of applying includes maintaining a relatively constant level of predetermined force. Particular embodiments of the step of applying a measured, or predetermined, force may also include extending the stitching wheel toward the interior tire surface. Extending the stitching wheel toward the interior surface allows the wheel to engage the surface when located a distance from the wheel.

The methods may further include the step of mechanically translating the stitching wheel laterally across the interior of the tire. It may be desirous to stitch a portion of a tire that has a lateral width (i.e., a portion that extends in a direction between the beads of the tire), such as when desiring to stitch a repair patch along an interior tire surface. Therefore, it may be desirous to translate the stitching head and/or wheel laterally across the tire (i.e., sideways in a direction between the beads of the tire) while the tire rotates about its central axis as the wheel contacts the interior tire surface, so as to stitch the entire width and circumference of the target surface. This lateral translation of the rotating wheel generates a spiral helical path along the interior tire surface, extending from one bead to the other, with a controlled pitch that may be used to control the incidence and amount of overlap of the wheel footprint over successive rotations. Particular embodiments of the step of mechanically translating may include laterally rotating the stitching wheel across the interior tire surface. The stitching wheel may be substantially aligned with the rotation of the tire, so that the stitching wheel spins or rotates with a tire when in contact with the tire. To translate the wheel laterally across portions of the tire, such as a tire sidewall, it may be desirous to rotate the stitching head and/or wheel sideways, or laterally, across such portion of the tire, where the lateral direction is not the direction in which the tire is rotated. Particular embodiments may include laterally rotating the stitching wheel across the interior tire surface, wherein the interior surface is associated with a sidewall of the tire, as translation across the sidewall may be achieved by angularly rotating the head up and/or down the sidewall. Particular embodiments of the step of translating may also include extending and/or retracting the stitching wheel relative to the interior tire surface. Because the surface of the tire being stitched may vary, it may be desirous to vary the extension of the wheel to accommodate high and low areas along the interior tire surface. Because a tire also includes an interior under-tread surface, particular embodiments of the step of translating may include translating the stitching wheel across the interior tire surface, wherein the interior surface is associated with an under-tread area of the tire. It follows that particular embodiments may include extending and/or retracting the stitching wheel.

Particular embodiments of the step of translating may comprise the steps of rotating the stitching wheel laterally across an interior tire portion associated with a first sidewall, translating stitcher across an interior tire portion associated with the under-tread area, and rotating the stitching wheel laterally across an interior tire portion associated with a second sidewall. The method and apparatus are capable of stitching the interior surface from bead to bead during a single operation. The method and apparatus are also capable of limiting stitching to particular portions of the interior tire surface.

Particular embodiments of the methods discussed herein may also include the steps of translating the stitching head and/or stitching wheel toward a sidewall, receiving a signal from a sensor, the signal indicating that the stitching head and/or stitching wheel is located adjacent the sidewall, and terminating the translation of the stitching head and/or stitching wheel subsequent to the step of receiving the sidewall-indicating signal.

Particular embodiments of the methods discussed herein may also include the steps of rotating the stitching head and/or stitching wheel laterally across a portion of the sidewall after the step of terminating the translation of the stitching head and/or stitching wheel. Such embodiments may also include the steps of rotating the stitching head and/or stitching wheel laterally toward the sidewall after the step of terminating the translation of the stitching head and/or stitching wheel and before the step of rotating the stitching wheel across a portion of the sidewall, and extending the stitching head and/or stitching wheel toward the sidewall after the step of rotating the stitching head and/or stitching wheel toward the first sidewall.

Such embodiments may also include the steps of receiving a signal from a sensor that the stitching wheel is in an end-rotation position, during the step of rotating the stitching wheel about a portion of the sidewall, and terminating the rotation of the stitching head and/or stitching wheel subsequent to receiving the end-rotation position-indicating signal. These embodiments may also include the steps of retracting the stitching wheel after the step of terminating the rotation. These embodiments may also include the step of translating the stitching head and/or stitching wheel toward a second sidewall, along an interior surface associated with a tread area of the tire. Particular embodiments hereof may include the steps of receiving a signal from a sensor, the signal indicating that the stitching head and/or stitching wheel is located adjacent the second sidewall, terminating the translation of the stitching head and/or stitching wheel subsequent to the step of receiving the second sidewall-indicating signal, and rotating the stitching head and/or stitching wheel laterally across a portion of the second sidewall after the step of terminating the translation of the stitching wheel.

The methods described herein are used to stitch a tire patch on an inside surface of a tire. Such methods may be employed by a stitching machine and/or embodied in a computer program product. Exemplary embodiments of the stitching machine for use in performing such methods are discussed in further detail below.

With reference to FIGS. 1-8, an exemplary tire stitching machine 10 is provided for stitching the interior (i.e., the pressurized side) of a tire 100. The machine 10 includes a frame 12 for attaching or maintaining the various components of machine 10, a stitching head 30 for applying pressure, or a force, to an inside surface of a tire, a tire mount 20 for maintaining and/or rotating a tire in relation to the stitching head 30, a head rotation assembly 50 for rotating the stitching head 30 in relation to an inside surface of a tire, and a head translation assembly 70 for translating head 30 across an inside surface of a tire, and a controller 90 for controlling the operation of machine 10.

Tire mount 20 maintains and/or rotates a tire in relation to the stitching head 30. Tire mount 20 may be designed to accommodate any tire type and size as desired. In an exemplary embodiment shown in FIGS. 1-2, tire mount 20 includes a pair of upper rollers 22 from which a tire 100 may hang, and a lower roller 24. Any roller 22, 24 may be moveable, so to constrain tire 100 about rollers 22, 24. In the particular embodiment shown in the FIGURES, lower roller 24 translates to constrain a tire about rollers 22, 24. More specifically, lower roller 24 applies a force to a lower portion of tire 100, generally opposite stitching head 30 and stitching wheel 32. Rollers 22 extend in a lateral direction to vertically support tire 100. Roller 24, in the exemplary embodiment, engages a bead area 104 ("beads") of tire 100, although it is contemplated that roller 24 may extend further to engage both tire beads. Each roller 22, 24 may include one or more retaining rings 25, which operate to constrain an associated tire along the length of each roller 22, 24. Any roller 22, 24 may be moveable to accept and constrain a tire 100 about rollers 22, 24. In the exemplary embodiment shown in the FIGS. 1 and 2, roller 24 translates between tire engaging and releasing positions, such as, without limitation, by way of a cylinder 26. In the present embodiment, cylinder 26 is a pneumatic cylinder, but it is contemplated that any translating means may be used, such as, without limitation, a hydraulic cylinder, a linear actuator, or a rotation device. Further, motor 28 is included to drive one or more of the rollers 22, 24, for the purpose of rotating a tire mounted thereon. Motor 28 may communicate rotational forces (i.e., be in operational communication with) any roller 22, 24 by any means known to one of ordinary skill in the art. In the present embodiment, rollers 22 are driven by motor 28. In operation, a tire 100 is hung on upper rollers 22 by the tire beads 104, wherein rollers 22 are inserted through the central opening of the tire. Roller 24 is also placed within the tire's central opening, and is subsequently lowered by way of cylinder 26 until a tire bead 104 is engaged, and the tire 100 is constrained within tire mount 20. In the exemplary embodiment, the tire is maintained in a rotatable position (i.e., it is capable of being rotated). Thereafter, motor 28 may commence to rotate the tire mounted thereon. It is contemplated that other means and methods of rotating tire may be employed.

Stitching head 30 engagingly applies pressure, or a force, to an interior surface 102 of a tire 100 with a stitching wheel 32. In particular embodiments, stitching head 30 laterally translates and rotates to be capable of engaging portions of the interior tire surface, such as those associated with a tire sidewall 106 and/or the under-tread area 108. In an exemplary embodiment generally shown in FIGS. 1-3, and more specifically shown in FIGS. 4-5, the stitching head 30 includes a stitching wheel 32 for engaging the tire surface. Stitching wheel 32 may comprise a wheel or a roller, or the like, and may be formed from any material known to one of ordinary skill in the art, such as, without limitation, steel. Stitching wheel 32 may comprise any sized stitching wheel, but in one exemplary embodiment, the stitching wheel is 8 to 10 millimeters (mm) wide. Stitching wheel 32 may also be slightly angled toward the direction of lateral, or sideways, travel to reduce any friction and/or heat that may otherwise be generated as the stitching wheel 32 translates laterally across the tire, between the beads (i.e., so stitching wheel 32 rolls, and does not drag, across the tire). In operation, the tire rotates about its central axis as the stitching wheel 32 contacts the interior tire surface 102, but because of the lateral translation and/or rotation of stitching wheel 32, a spiral helical path is created by wheel 32 along the interior tire surface.

The exemplary embodiment of the head 30 shown in the FIGURES also includes a thruster 34 that applies a measured force against the interior tire surface 102 by way of stitching wheel 32 to generate a stitching pressure or force. Thruster 34 also extends and retracts stitching wheel 32 relative to the interior tire surface 102. In the exemplary embodiment shown, thruster 34 is a pneumatic thruster. In particular embodiments, stitching wheel 32 applies upwards of 120 pounds upon tire 100 by way of pneumatic thruster 34, although it is contemplated that higher forces may be used, such as when stitching wheel 32 is wider or when particular tires or circumstances dictate higher forces. In another embodiment, stitching wheel 32 applies about 60 pounds upon tire 100. In other embodiments, the thruster 32 applies between 60 and 100 pounds. The force applied by thruster 34 may be predetermined, or otherwise selected by controller 90 or a user. It has been found that the force applied by wheel 32 may be constant as the wheel 32 travels along the inside tire surface 102, even when wheel 32 travels over a tire patch located along tire surface 102. Although thruster 34 may extend as far as desired, in particular embodiments, thruster 34 may extend up to 25 mm. In the exemplary embodiment shown in the FIGURES, thruster 34 allows stitching wheel 32 to adapt to the contour of the interior tire surface 102 as head 30 travels laterally across a tire. Thruster 34 achieves this by extending and retracting under pressure to track the changing surface contour. This is especially useful when the head 30 travels up or down a tire sidewall 106. It is contemplated that in other embodiments, thruster 34 may comprise any linear actuator, or pneumatic or hydraulic cylinder.

In accordance with the exemplary embodiment shown in the FIGURES, head 30 also includes a shaft 36, about which thruster 34 and attached stitching wheel 32 rotate in a substantially lateral (i.e., sideways) direction relative to tire 100. Lateral rotation of stitching wheel 32 and thruster 34 allows stitching wheel 32 to translate laterally (i.e., sideways) across desired portions of interior tire surface 102, such as, for example, along tire sidewalls 106. Rotation may be facilitated by a head rotation assembly 50. It is contemplated, however, that other means of rotating thruster 34 and wheel 32 may be used by one having ordinary skill in the art.

Head rotational assembly 50 generally includes a motor 54 for rotating head 30. In the exemplary embodiment shown generally in FIGS. 2-3, rotational assembly includes a shaft 52 driven by a motor 54. Motor 54 may directly engage shaft 52, or may utilize other known means for transferring rotational forces, such as, without limitation, one or more gears, pulleys, chains, and belts. By way of similar means, shaft 52 communicates with shaft 36, and thereby rotates shaft 36, thruster 34, and stitching wheel 32. In the exemplary embodiments shown, a belt and pulley system 56 communicates rotational forces from shaft 52 to head 30.

Because belt and pulley system 56 rotates about an axis that extends in a non-parallel direction with respect to the rotational axis of shaft 52, the one or more gears 58 may comprise bevel or worm gears, or any other means to convert the rotation of shaft 52 to that of pulley 56. It is contemplated that any mechanism for transferring rotation from shaft 52 to belt and pulley system 56 may be used, such as, without limitation, worm gears, reduction gears, and friction discs.

The rotation provided by head rotation assembly 50 may be controlled to rotate the stitching wheel 32 laterally (i.e., sideways) across a tire 100, such as, without limitation, from a bottom portion of a tire sidewall 106 up to a tread underside area 108, or otherwise a vertical (i.e., radial) orientation. In achieving this, an association between the desired rotation of head 30, the revolution of the motor 54 and/or shaft 52 may be known. For example, it may be known that a particular number of revolutions of shaft 52 or motor 54 may achieve a desired rotation of head 30. Rotation assembly 50 may also include one or more sensors 62, which may comprise any sensor known to one of ordinary skill in the art for determining and/or controlling the rotational position of head 30.

Figure 2:
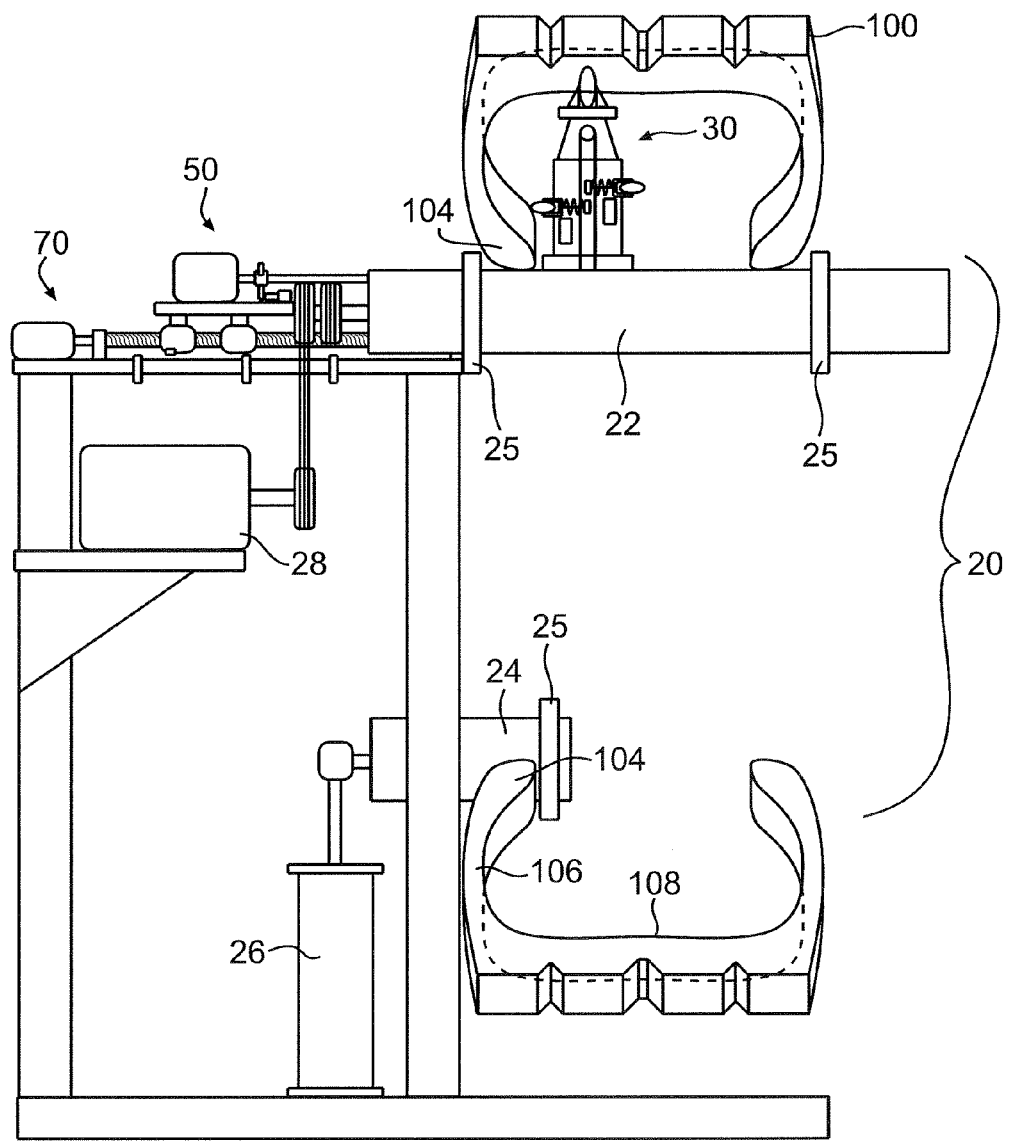
FIG. 2 is a side view of the tire stitching machine shown in FIG. 1.
Figure 3:
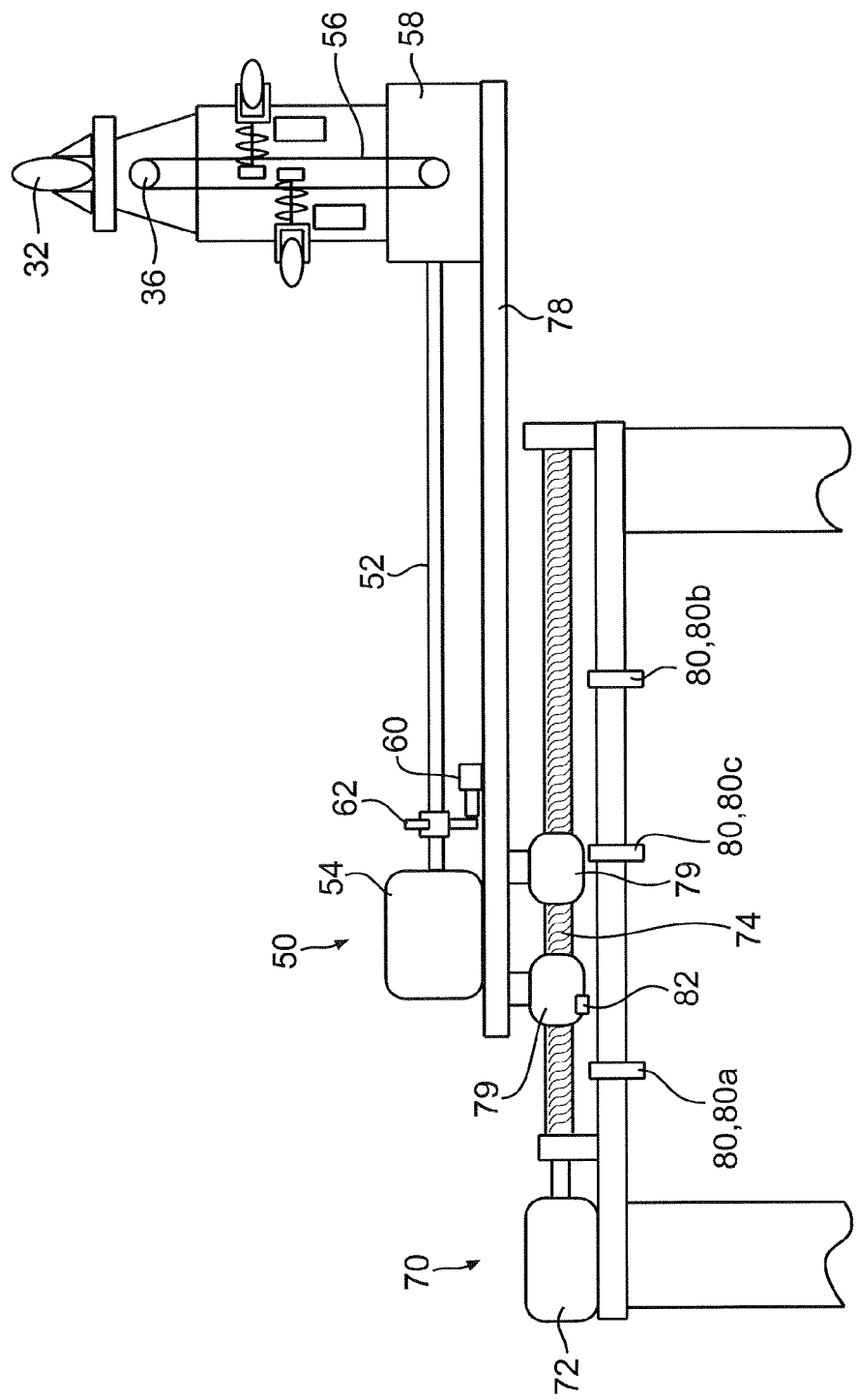
FIG. 3 is a side view of the head rotation and translation assemblies, according to an embodiment of the tire stitching machine shown in FIG. 1.
Figure 4:
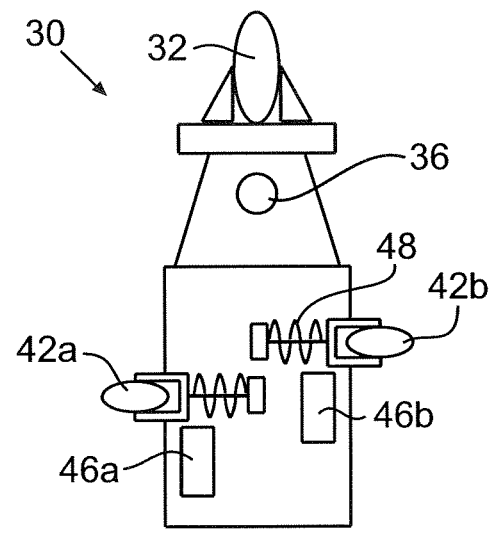
FIG. 4 is a side view of an embodiment of the stitching head of the tire stitching machine shown in FIG. 1.
Figure 5:
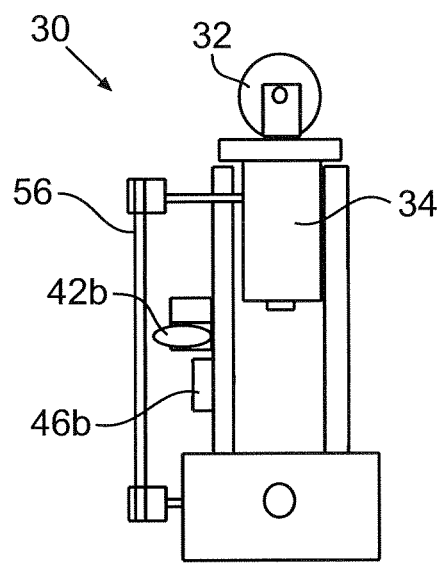
FIG. 5 is a front view of an embodiment of the stitching head of the tire stitching machine shown in FIG. 1.
Figure 6:
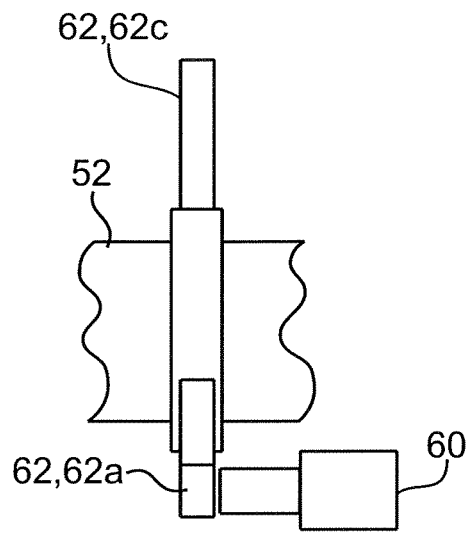
FIG. 6 is a side view of a sensor and finger arrangement of the head rotation assembly, according to an embodiment of the tire stitching machine shown in FIG. 1.
Figure 7:
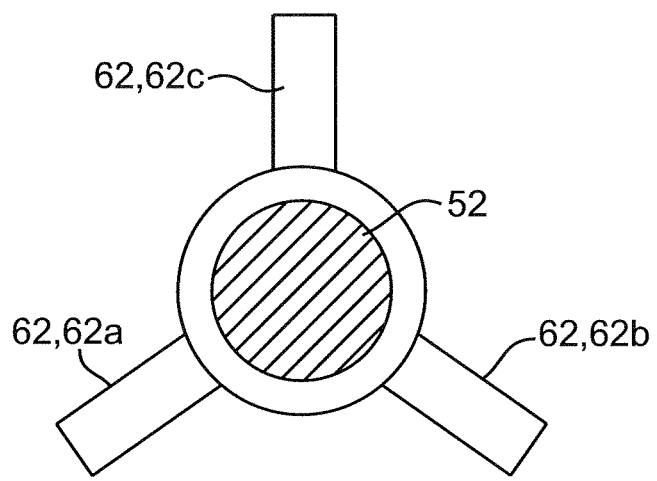
FIG. 7 is a front view of finger arrangement of the head rotation assembly, according to an embodiment of the tire stitching machine shown in FIG. 1.
Figure 15:
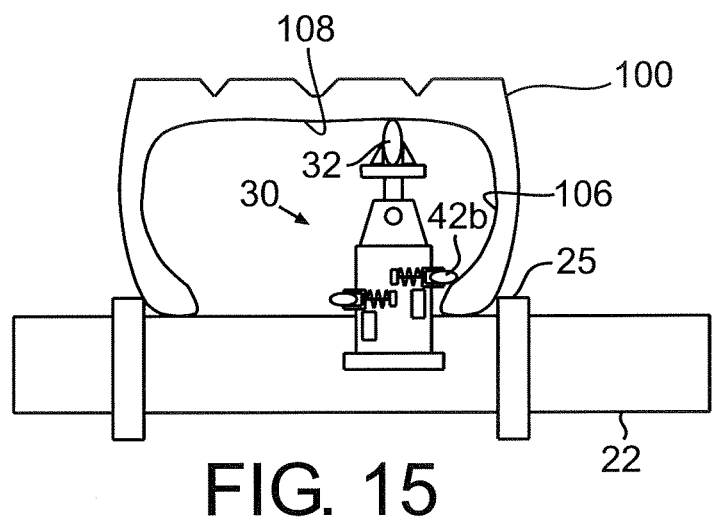
FIG. 15 is a schematic side view of the stitching head of FIG. 14 showing the head assembly, and the stitching wheel thereof, in a vertical position adjacent an inner sidewall after translating along the interior under-tread surface, in accordance with an embodiment of the present invention.
Figure 16:
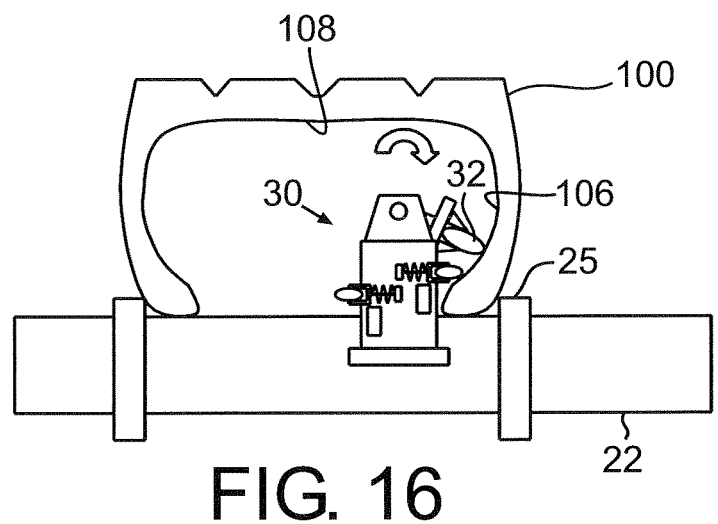
FIG. 16 is a schematic side view of the stitching head of FIG. 15 showing the head assembly, and more specifically the stitching wheel thereof, rotating along and down the interior surface of inner sidewall, in accordance with an embodiment of the present invention.

In an exemplary embodiment, generally shown in FIGS. 2-3, and more specifically shown in FIGS. 6 and 7, one or more sensors 60 are located along shaft 52 to determine and/or control the rotation of head 30. In this exemplary embodiment, sensors 60 comprise proximity switches that are positioned to identify extensions ("fingers") 62 projecting from shaft 52. Fingers 62 are located in desired positions about shaft 52 to indicate particular rotated positions of head 30. In particular embodiments, fingers 62a, 62b, 62c indicate that head 30 is located in an outer bead or sidewall position (see FIG. 10), an inner bead position (see FIG. 15), and a vertical position (see FIG. 9), respectively. It is contemplated that independent sensors 60 may be dedicated to sensing a particular finger 62, and that any quantity of fingers may used.

As mentioned above, head 30 may translate laterally between beads 104. Accordingly, stitching machine 10 may include a means of controlling the lateral (i.e., sideways) translation limits of head 30. In one exemplary embodiment shown in FIGS. 1-5, sensors 46a, 46b are used to sense and/or indicate that the head 30 is located adjacent to tire bead area 104, or the sidewall area 106. Sensors 46a, 46b may generate signals to indicate that head 30 has reached a translational limit. In one embodiment, a signal is sent to a controller 90, where controller 90 utilizes the signal to terminate the lateral translation of head 30, and the operation of head translation assembly 50. Sensors 46a, 46b may comprise proximity switches or sensors, or any other sensor or switch capable of indicting the location of head 30 relative to the tire 100. In the embodiment shown, sensors 46a, 46b are proximity switches that are engaged when a roller 42a, 42b contacts a bead area 104. Rollers 42a, 42b are located on opposing sides of head 30 to engage tire bead areas 104. Rollers 42a, 42b may rotate when engaging a rotating tire 100, to avoid damaging tire 100. Further, rollers 42a, 42b may be biased relative to the ground plane, for the purpose of aligning its direction of rotation with that of the tire portion that each is to contact. In operation, as a roller 42a, 42b engages the tire, the roller is pushed inward against the pressure of a spring 48. The inward translation triggers the corresponding proximity switch 46a, 46b, which generates a signal that is sent to controller 90 for the purpose of terminating any further lateral translation of head 30. It is contemplated that other means or systems for sensing the lateral position of head 30 may be used and employed by one having ordinary skill in the art.

Stitching machine 10 also includes a means for laterally translating head 30 between bead areas 104. It the present embodiment, such means comprises a head translation assembly 70 to linearly translate head 30 laterally between beads 104, while rotation assembly 50 translates head 30 by means of rotation laterally across a portion of the interior surface 102. Together, head translation assembly 70 and rotation assembly 50 may allow stitching wheel 32 to stitch the interior surface from one bead 104 to the other bead 104 while the tire rotates about its central axis as the stitching wheel 32 contacts the interior surface of the tire along a circumference of tire 100. As shown exemplarily in FIGS. 1-3, translation assembly 70 includes a head mount 78, to which head 30 is operably attached. Accordingly, head 30 translates with head mount 78 as mount 78 translates along threaded shaft 74. Motor 72 rotates shaft 74 as desired, while blocks 79 operably connect mount 78 with shaft 74 and convert the rotational motion into linear motion. It is contemplated that other means of translating head 30, known to one of ordinary skill in the art, may be used in this stitching machine 10. It is also contemplated that one or more sensors 80 may exist to limit the translation of head 30. In the present embodiment, one or more sensors 80 may be located along shaft 74. Sensors 80 may be proximity sensors that sense the presence of a flag 82, or any other desired object. Sensors 80a and 80b function to define outer translation limits of head 30, which operate to prevent any over-travel of head 30 and any subsequent damage to machine 10, such as when stitching machine 10 does not contain a tire or when sensors 46a, 46b fail. Sensor 80c may define a translational home position, from which head 30 may begin a stitching operation, and to which head 30 may return after performing a stitching operation. It is alternatively contemplated that a single sensor 80 may be substituted for flag 82 to translate with head 30, while multiple flags 82 may remain stationary and be substituted for sensors 80a, 80b, 80c. It is also contemplated that other sensor arrangements may be used by one having ordinary skill in the art.

Figure 8:
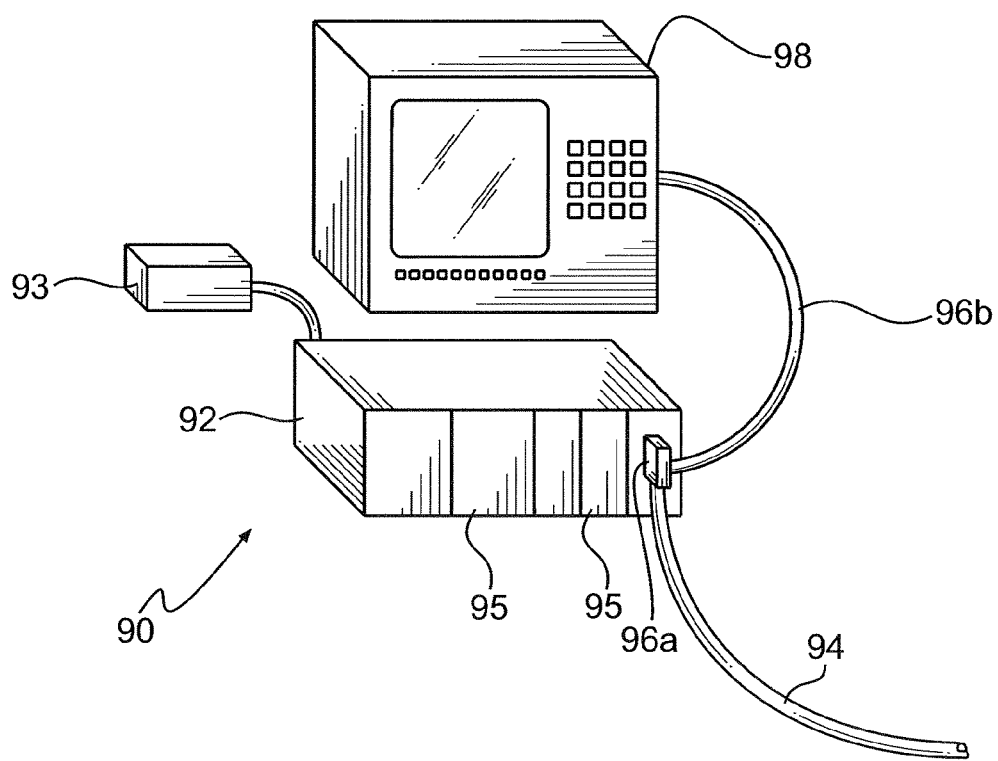
FIG. 8 is a schematic side view of a logic controller of tire stitching machine shown in FIG. 1, made in accordance with an exemplary embodiment of the invention.

With reference to the exemplary embodiment shown in FIG. 8, machine 10 includes a programmable logic controller 90, or any other device having a processor that can execute programmed instructions, such as, for example, a personal computer or main frame computer. Machine 10 may also include a user interface 98. Controller 90 generally receives signal responses from sensors 46a, 46b, 60, and/or 80 to control the movement of head 30 in relation to the inside surface 102 of a tire 100. Controller 90 may include a logic processor 92 (which may be a microprocessor), a memory storage device 93, such as RAM (random access memory), ROM (read-only memory), PROM (programmable read-only memory), and at least one input/output (I/O) cable 94 for communicating with machine 10. Further, controller 90 may include an I/O slot 95 for housing an I/O card having I/O cable connector 96. An operator may utilize a user-interface 98 to control or instruct the operation of controller 90 and machine 10, which includes performing each step and method associated with stitching a repair patch on the interior of a tire as detailed herein. User-interface 98 and controller 90 may communicate by way of I/O cable 96. It is also contemplated that wireless communications may exist between controller 90, user-interface 98, and machine 10. Generally, controller 90 may be programmed by any known graphical or text language. Programmed instructions, data, input, and output may be stored in a memory storage device 93, which is accessible to processor 92. Memory device 93 may comprise any commercially known storage device, such as hard disk drives, optical storage devices, flash memory, and the like. Processor 92 executes programmed instructions and may perform the instructions and any calculations and/or measurements useful for controlling machine 10 and performing the methods and operations discussed herein. Memory storage device 93 also stores inputs, outputs, and other information, such as, the geometry of the tire, the desired speed of rotation for the tire, and the rotation and translation of head 30.

Figure 9:
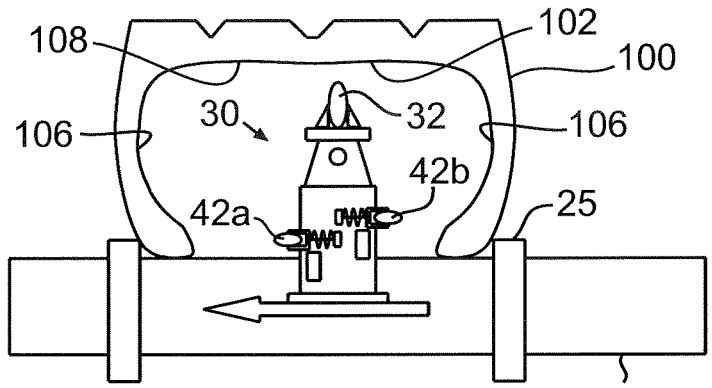
FIG. 9 is a schematic side view of the stitching head located within a tire and translating towards the outer bead and sidewall, in accordance with an embodiment of the present invention.

The operation of a machine 10, in an exemplary embodiment, is described in FIGS. 9-16. Once a tire 100 is mounted onto the tire mounting assembly 20 of machine 10, as shown in FIG. 9, stitching of any interior surface 102 of the tire may be initiated and performed. In particular embodiments, machine 10 stitches laterally (i.e., sideways) across the inside tire surface 102, between beads 104. It is contemplated that in other embodiments, in lieu of stitching the tire from side to side, stitching may be performed along a desired sidewall 106, the under-tread area 108, or along any portions thereof between beads 104. Initially head 30 may begin from a home position, which may be centrally located between beads 104. After stitching is completed, head 30 may return to the home position.

Figure 10:
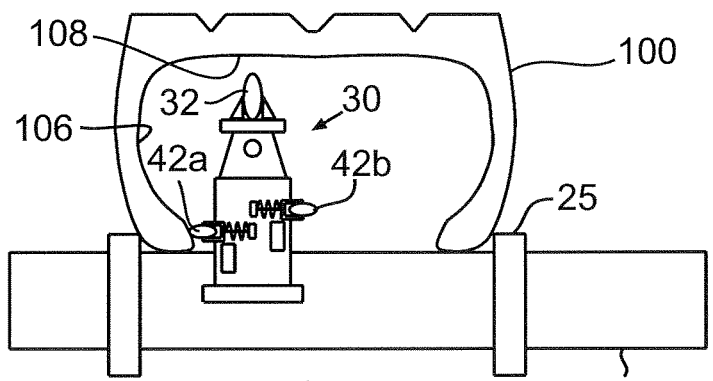
FIG. 10 is a schematic side view of the stitching head of FIG. 9 located adjacent an outer bead and sidewall, in accordance with an embodiment of the present invention.
Figure 11:
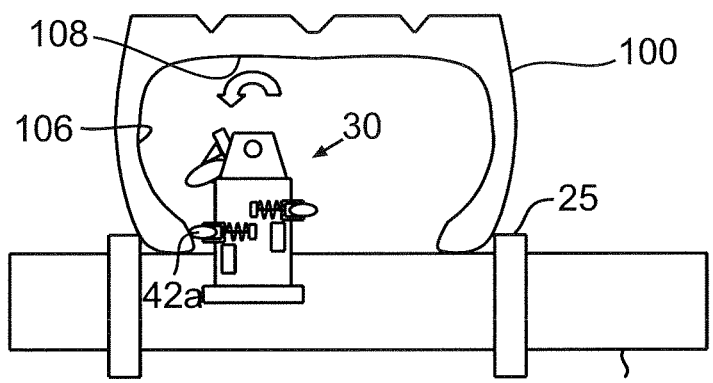
FIG. 11 is a schematic side view of the stitching head of FIG. 10 showing the head assembly, and the stitching wheel thereof, rotating in accordance with an embodiment of the present invention.
Figure 12:
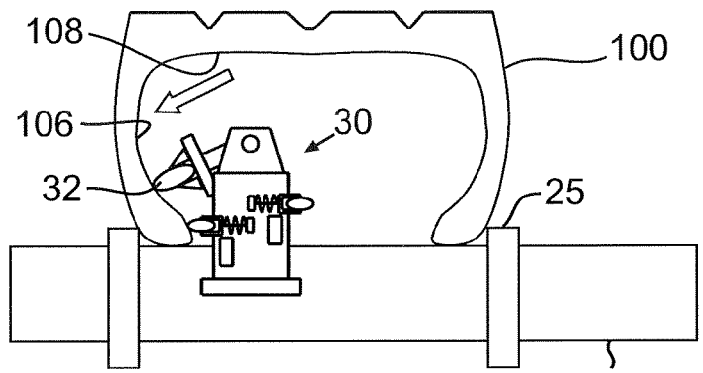
FIG. 12 is a schematic side view of the stitching head of FIG. 11 showing the head assembly, and more specifically the stitching wheel thereof, extending in accordance with an embodiment of the present invention.
Figure 13:
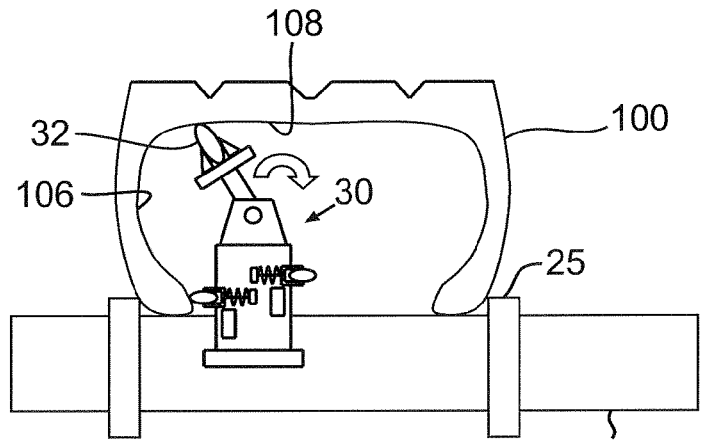
FIG. 13 is a schematic side view of the stitching head of FIG. 12 showing the head assembly, and the stitching wheel thereof, rotating along and up the interior surface of the outer sidewall in accordance with an embodiment of the present invention.

Once the stitching operation has been initialized, head 30 begins to translate towards an initial tire engaging position. With reference to FIG. 10, particular embodiments include laterally translating the head 30 and/or wheel 32 by way of translating assembly 70 from a starting or home position toward a tire bead 104 or sidewall 106. In specific embodiments, head 30 initially translates toward the outer tire bead 104 or sidewall 106 ("outer" refers to the tire portions located nearest the outer portion of machine 10).

Once head 30 reaches a desired tire engaging position, translation of head 30 is terminated. Once in a desired tire engaging position, which may be sensed or otherwise determined by machine 10, stitching wheel 32 may laterally rotate if intending to engage a sidewall 106, or extend if intending to engage an under-tread area 108. In particular embodiments, as exemplarily shown in FIG. 10, a roller 42a engages an outer portion of the tire to trigger sensor 46a. Sensor 46a generates a signal that is used by controller 90 to terminate the translation of head 30 and initialize the rotation of head 30, or stitching wheel 32, by way of rotation assembly 50, which is exemplarily shown in FIG. 11. Rotation assembly 50 rotates stitching wheel 32 to a desired position toward a sidewall portion 106. Once stitching wheel 32 reaches a desired position, the rotation of stitching wheel 32 terminates. In particular embodiments, the desired rotational position of stitching wheel 32 (i.e., the amount of rotation provided by shaft 52) along an outer sidewall portion 106 is defined by the circumferential location of finger 62a along the circumference of shaft 52. Once sensor 60 senses finger 62a, a sensor 60 generates a signal that causes controller 90 to suspend rotation of stitching wheel 32.

After head 30 or stitching wheel 32 reaches a desired tire engaging position, which may be a vertical or rotated position, the head 30 or stitching wheel 32 may be extended to engage an interior tire surface 102. In a particular embodiment shown in FIG. 12, thruster 34 may extend so to engage stitching wheel 32 with the interior tire surface 102 after stitching wheel 32 reaches a desired rotated position. Upon engagement, thruster 34 may be pressurized to a particular pressure and extended so that stitching wheel 32 engages the corresponding sidewall 106. Head 30 then rotates up or down the corresponding sidewall 106, as exemplarily shown in FIG. 13, and thruster 34 may extend and/or retract during such rotation to maintain stitching wheel 32 in a sidewall-engaging position (i.e., so to adapt to the particular profile of the corresponding sidewall). During such rotation, thruster 34 may operate at the particular pressure, or may operate at variable pressures as desired. It is also contemplated that head 30 may translate as the head 30 rotates up or down a sidewall surface 106.

Figure 14:
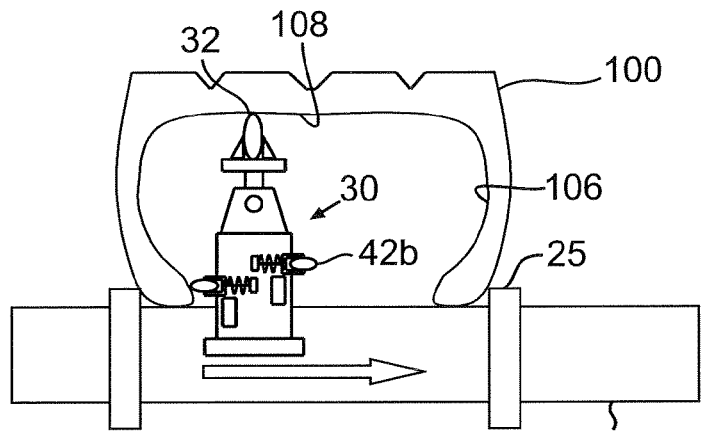
FIG. 14 is a schematic side view of the stitching head of FIG. 13 showing the head assembly, and the stitching wheel thereof, in a vertical position after rotating along the outer sidewall and translating along the interior under-tread surface of the tire toward an inner sidewall, in accordance with an embodiment of the present invention.

With reference to a particular embodiment shown in FIG. 14, the rotation of head 30 terminates once reaching a desired position, such as a vertical position. In particular embodiments, the termination position is defined by the location of finger 62c along the circumference of shaft 52 and sensed by sensor 60. In such embodiments, a signal generated by sensor 60 is used by controller 90 to suspend rotation of stitching wheel 32. Controller 90 then instructs translation assembly 70 to translate head 30 across at least a portion of the under-tread surface 108, as exemplarily shown in FIG. 14 until sensor 46b contacts the other bead area 104, as exemplary shown in FIG. 15. Upon contacting the other bead area 104, sensor 46b may generate a signal that controller 90 uses to instruct the translating assembly 70 to suspend any translation of head 30. Controller may also then instruct that the rotation assembly 50 rotate head 30 or stitching wheel 32 down sidewall 106, as shown exemplarily in FIG. 16.

Rotation down sidewall 106 may continue until stitching wheel 32 reaches a desired area along the inside surface of sidewall 106. In particular embodiments, head 30 rotates until sensor 60 senses finger 62b, which is located about the circumference of shaft 52 to define the final rotation position along inner sidewall 106. In such embodiments, sensor 60 generates a signal that controller 90 uses to subsequently instruct rotation assembly 50 to terminate any rotation of stitching wheel 32. Subsequent thereto, thruster 34 may be retracted, rotated, such as rotating back to a vertical position, and/or may be translated to a particular position away from bead area 104 by way of translation assembly 50, where such position may be the starting and/or home position of head 30. In particular embodiments, controller 90 uses the signal generated by sensor 60 upon sensing finger 62b to subsequently instruct rotation assembly 50 to terminate the rotation of stitching wheel 32 down inner sidewall 106. Controller 90 may further instruct thruster 34 to retract stitching wheel 32 from engagement with sidewall 106, instruct rotation assembly 50 to rotate stitching wheel 32 back to a vertical position defined by finger 62c, and/or instruct translation assembly 70 to return head to a home or starting position between beads 104.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for automatically stitching an interior surface of a tire, the method comprising:
   positioning the tire in rotatable position configured to rotate around a central rotational axis of the tire;
   rotating the tire about a central rotational axis of the tire;
   applying a force to maintain the tire in a substantially fixed radial position relative to the central rotational axis of the tire while a force is being applied by a stitching wheel;
   applying a predetermined force to the interior surface of the tire with the stitching wheel, the stitching wheel contacting the interior surface of the tire while the tire is rotating; and,
   simultaneously mechanically translating the stitching wheel and a central rotational axis of the stitching wheel laterally parallel to an axial direction of the tire across and relative to the interior of the tire and a tire patch arranged thereon during tire rotation as the stitching wheel rotates about the central rotational axis of the stitching wheel while contacting the interior surface of the tire during stitching wheel translation, the step of mechanically translating comprising:
   translating the stitching wheel and the central rotational axis of the stitching wheel laterally across an under-tread area of the interior tire surface by linearly moving a support of the stitching wheel laterally; and, upon contacting a first sidewall of the tire and actuating a first proximity sensor thereby, stopping the lateral linear movement of the stitching wheel support and holding the stitching wheel support stationary as the stitching wheel and the central rotational axis of the stitching wheel are rotated about a first pivoting rotational axis spaced from the central rotational axis of the stitching wheel to traverse the stitching wheel across a width of the interior surface of the first sidewall; and, upon contacting a second sidewall of the tire and actuating a second proximity sensor thereby, stopping the lateral linear movement of the stitching wheel support and holding the stitching wheel support stationary as the stitching wheel and the central rotational axis of the stitching wheel are rotated about a second pivoting rotational axis spaced from the central rotational axis of the stitching wheel to traverse the stitching wheel across a width of the interior surface of the second sidewall.

2. The method recited in claim 1, wherein the step of applying a force to the interior surface includes maintaining a relatively constant predetermined force.

3. The method recited in claim 1, wherein the step of applying a force to the interior surface includes extending the stitching wheel toward the interior tire surface.

4. The method of claim 1, further comprising the steps of:
receiving a signal from a sensor that the stitching wheel is in an end-rotation position during the steps of rotating.

5. The method of claim 1, wherein during the steps of rotating the stitching wheel and the central rotational axis of the stitching wheel, the stitching wheel is extended and retracted as the stitching wheel and the central rotational axis of the stitching wheel are rotated across the width of the interior tire surface associated with the sidewalls.

6. The method of claim 1, wherein the central rotational axis of the stitching wheel is angled toward the direction of lateral travel of the stitching wheel.

7. The method of claim 1, wherein the stitching wheel is brought into contact with a bead area of the first sidewall and a bead area of the second sidewall.

8. The method of claim 1, where the method is performed by an apparatus for stitching the interior surface of the tire, the apparatus comprising:
a tire mount capable of rotating the tire about the central rotational axis of the tire;
the stitching wheel;
thruster for generating the force to be applied to the tire with the stitching wheel in the step of applying a predetermined force to the interior surface of the tire;
translating assembly for translating the stitching wheel laterally across the interior of a tire in the step of mechanically translating; and,
a rotating assembly for rotating the stitching wheel and the central rotational axis of the stitching wheel in the steps of rotating the stitching when and the central rotational axis of the stitching wheel.

9. The method of claim 8 wherein the apparatus includes a controller comprising a processor and a memory storage device that stores instructions readable by the processor.

10. The method of claim 9, wherein said controller further comprises:
rotating instructions for rotating the tire circumferentially;
applying instructions for applying a force to the interior surface of the tire with the stitching wheel;
translating instructions for translating the stitching wheel across the interior tire surface associated with the undertread area of the tire; and,
rotating instructions for rotating the stitching wheel and the central rotational axis of the stitching wheel across the interior surfaces of the sidewalls.

11. The method of claim 10, the applying instructions include extending instructions for extending the stitching wheel toward the interior tire surface.

* * * * *